UNITED STATES PATENT OFFICE.

WILLIAM P. KIRCHHOFF AND JAMES W. KIRCHHOFF, OF NEW ORLEANS, LOUISIANA.

MANUFACTURE OF CANDY.

SPECIFICATION forming part of Letters Patent No. 457,439, dated August 11, 1891.

Application filed September 22, 1890. Serial No. 365,784. (No specimens.)

*To all whom it may concern:*

Be it known that we, WILLIAM P. KIRCHHOFF and JAMES W. KIRCHHOFF, citizens of the United States, residing at New Orleans, in the parish of Orleans and State of Louisiana, have invented certain new and useful Improvements in the Manufacture of Candy; and we do hereby declare that the following is a full, clear, and exact description of the same.

The object of our invention is to provide an improved method of manufacturing candy, whereby an improved, superior, and cheaper product of candy is obtained. We effect this object by a process, to be hereinafter fully explained, of reducing sugar solutions *in vacuo* from a comparatively thin or light density to a heavier density, but not to a consistency appropriate for the manufacture of candy or to a hard crack, then finishing the boiled product by open evaporation at a high temperature in a short time.

Heretofore candies have been manufactured by two methods of boiling the sugar solutions employed. One method consists in boiling the mixture or compound of cane-sugar, or "sucrose," and grape-sugar, or "glucose," in an open vessel to the proper candy consistency or to the consistency termed "hard crack." The other method consists in boiling the mixture or compound of cane-sugar and grape-sugar, or glucose, *in vacuo* to the proper candy consistency or to the consistency of hard crack. Each of these mentioned methods or processes of making candies has its disadvantages, acting, as they do, detrimentally on the sugar solution and on the resulting candy product. The long-continued boiling in the open kettle of a comparatively thin sirup solution of cane-sugar and grape-sugar, or glucose mingled therewith, the boiling being continued until the mixture arrives at a heavy consistency appropriate for the production of candy, or to the consistency of what is termed a "hard crack," the mixture or compound being necessarily exposed throughout the whole period of boiling to a very high temperature, has the effect of considerably darkening or coloring the compound of cane-sugar and grape-sugar, as well as the resulting candy product. This coloring of the mixture is due to the fact that the high temperature necessary for effecting the evaporation of the solution in an open vessel forms a substance called "caramel," which is the same as burnt sugar. This substance has the property of imparting a dark color to a solution of cane-sugar or grape-sugar, or a mixture or compound of both. The coloring varies in intensity in proportion to the length of time required to bring the solution to the required consistency, and also in proportion to the intensity of the heat required to effect the boiling during said time. Of course the quality, as well as the value of the candy, produced is lowered very considerably by being darkened. The color of the candy being dependent on the color of the sugar used, the lighter the color of the sugar employed the less dark will the candy be, and vice versa. Thus the manufacturer in making high-grade candies is obliged to make use of the best quality of sugars and use the high-priced grades of the same.

Another injurious action of boiling a compound of cane-sugar and grape-sugar mingled, or, in fact, any sugar solution, in an open vessel at a high temperature for a long time is the conversion or change of a large proportion of the cane-sugar ($C_{12}H_{11}O_{11}$) into grape-sugar, or glucose, or, as it is sometimes termed, "fructose," or fruit-sugar, which is uncrystallizable. The formation of this sugar obliges the manufacturer to reduce the amount of the artificial or commercial grape-sugar which he adds to the cane-sugar for the purpose of reducing the first cost of the candy. This fact prevents him from mixing as large a proportion of grape-sugar with the cane-sugar as he would if he was not obliged to expose the compound or mixture of cane-sugar and grape-sugar in an open pan for such a long while and to so high a temperature while boiling.

The objection to or disadvantages of the process of boiling the compound of cane-sugar and grape-sugar *in vacuo* to a consistency appropriate for candy or to the consistency of a hard crack is found in the fact, demonstrated by practical observation and experience, that candy manufactured by that process becomes very hydroscopic, or capable of readily absorbing moisture upon exposure to the atmosphere, and thus soon becomes sticky and unfit for the trade. The candy made by this process thus becomes unsalable in a very short while, and especially so in hot and moist climates.

Manufacturers who have been making use of the vacuum process during the summer months have been compelled to return to the open-air-evaporating process, in order to be able to furnish their trade with candy which would not become so moist and sticky as to be unsalable. The open-kettle process, although it darkens the color of the resultant candy and makes an inferior product in point of color, produces, nevertheless, a candy which is not hydroscopic to the same extent as that produced in vacuo.

The exceedingly high temperature incident to boiling a compound of cane-sugar and grape-sugar in an open kettle or vessel would be considered a great advantage for the production of candy if the manufacturer could control the temperature of the boiling mass in such a manner as to be able to lower it considerably at the commencement of the boiling process and raise it suddenly just previous to bringing the boiling mixture to the appropriate candy consistency or hard crack; but this is practically impossible, owing to the fact that the contents of the kettle have to be at a very high and injurious temperature throughout the whole process, in order to keep the mixture continually boiling until it reaches the candy consistency.

It is a fact well known to practical and experienced sugar and candy boilers or cookers that a very high temperature acting for a comparatively short time upon sugar solutions has a very beneficial effect upon the resulting sugar or candy product, making it harder, more brilliant, clearer, and less hydroscopic than it otherwise would be. Now in the vacuum process the temperature of the boiling solution of sugar-cane and grape-sugar or glucose is very low, owing to the fact that the boiling-point is lowered by the removal of the atmospheric pressure from the surface of the boiling solution, and the purpose and object of boiling in vacuo are to obtain this reduction of the boiling point or temperature.

The process embodying our invention depends upon the successive steps of boiling in vacuo to a consistency short of the candy-point or hard crack, followed by the subsequent boiling in an open vessel, heated by steam or by a direct fire, in such a manner as to secure the advantages of either process without their respective disadvantages or objectionable features.

We are aware that neither the vacuum process nor the boiling of a compound of cane-sugar and grape-sugar or glucose in an open vessel is a new element or step in the candy manufacture; but by the combination of these two elements or steps in the manner set forth we have secured a process for manufacturing candies which is new and useful and capable of producing a candy which possesses greater brilliancy, lighter color, greater transparency, greater hardness, and is less hydroscopic when exposed to the moisture and heat of the atmosphere.

The method of conducting the operation is as follows: Our process consists in boiling or cooking cane-sugar, or a mixture or compound of cane-sugar and grape-sugar or glucose in vacuo until it has been evaporated to a very much heavier consistency than it originally possessed, but not to a consistency suitable for the production of candy or to the consistency of hard crack, next, boiling or finishing this already boiled product, which is composed of a compound of cane-sugar or grape-sugar, by open steam or direct fire evaporation under normal atmospheric pressure at a high temperature for a short time, until the mixture arrives at a consistency suitable for the candy required, or to a stick-candy consistency, or to the consistency of what is termed a "hard crack." Having arrived at this point, the product is discharged and is ready for further manipulation, if desired.

Having thus described our process and explained its operation, what we claim, and desire to secure by Letter Patent, is—

The improved process of manufacturing candy, consisting in cooking a compound or mixture of cane-sugar and grape-sugar in vacuo, and then boiling or cooking the partly-evaporated product in an open vessel until it arrives at a proper consistency, substantially as described.

In testimony whereof we have hereunto subscribed our names in the presence of two witnesses.

WILLIAM P. KIRCHHOFF.
JAMES W. KIRCHHOFF.

Witnesses:
W. H. COOK,
ROBERT RIES.